United States Patent
Suzuki

(10) Patent No.: US 12,534,599 B2
(45) Date of Patent: Jan. 27, 2026

(54) RUBBER COMPOSITION FOR BASE TREAD AND TIRE

(71) Applicant: BRIDGESTONE CORPORATION, Tokyo (JP)

(72) Inventor: Shoko Suzuki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 234 days.

(21) Appl. No.: 17/757,163

(22) PCT Filed: Oct. 15, 2020

(86) PCT No.: PCT/JP2020/038974
§ 371 (c)(1),
(2) Date: Jun. 10, 2022

(87) PCT Pub. No.: WO2021/117337
PCT Pub. Date: Jun. 17, 2021

(65) Prior Publication Data
US 2023/0072567 A1  Mar. 9, 2023

(30) Foreign Application Priority Data

Dec. 13, 2019  (JP) ................... 2019-225890
Dec. 13, 2019  (JP) ................... 2019-225896

(51) Int. Cl.
*B60C 1/00* (2006.01)
*B60C 11/00* (2006.01)
*C08L 7/00* (2006.01)

(52) U.S. Cl.
CPC ............. *C08L 7/00* (2013.01); *B60C 1/0016* (2013.01); *B60C 11/005* (2013.01); *B60C 2011/0025* (2013.01)

(58) Field of Classification Search
CPC ............... B60C 11/005; B60C 1/0016; B60C 2011/0025; C08L 7/00
See application file for complete search history.

(56) References Cited

U.S. PATENT DOCUMENTS

| 9,436,306 B2 | 9/2016 | Oguri |
| 2013/0153108 A1 | 6/2013 | Tanaka et al. |
| 2013/0153109 A1 | 6/2013 | Shimanaka et al. |
| 2015/0031792 A1* | 1/2015 | Dunlavy ................. C08F 36/06 523/157 |
| 2016/0376426 A1* | 12/2016 | Kimura ..................... C08L 7/00 524/518 |
| 2018/0244104 A1 | 8/2018 | Kuwayama et al. |
| 2019/0010312 A1 | 1/2019 | Nukaga |
| 2019/0168542 A1* | 6/2019 | Hashimoto ............... C08L 7/00 |
| 2019/0264011 A1 | 8/2019 | Tochika |
| 2021/0171743 A1 | 6/2021 | Shoda |

FOREIGN PATENT DOCUMENTS

| EP | 2022649 A1 | 2/2009 |
| EP | 3196053 A1 | 7/2017 |
| EP | 3466720 A1 | 4/2019 |
| JP | 2008-303330 A | 12/2008 |
| JP | 2009-242576 A | 10/2009 |
| JP | 2010-090225 A | 4/2010 |
| JP | 2013-69027 A | 4/2013 |
| JP | 2013-528237 A | 7/2013 |
| JP | 2013-528238 A | 7/2013 |
| JP | 2016-006135 A | 1/2016 |
| JP | 2017-052329 A | 3/2017 |
| JP | 2017-206194 A | 11/2017 |
| JP | 2017-209194 A | 11/2017 |
| JP | 2017-210191 A | 11/2017 |
| JP | 2018-095702 A | 6/2018 |
| JP | 2019-038875 A | 3/2019 |
| JP | 2019-142472 A | 8/2019 |
| WO | 2015/079703 A1 | 6/2015 |
| WO | 2017/126633 A1 | 7/2017 |
| WO | 2019/111546 A1 | 6/2019 |

OTHER PUBLICATIONS

International Preliminary Report on Patentability with Translation of Written Opinion dated May 17, 2022 in International Application No. PCT/JP2020/038974.
International Search Report for PCT/JP2020/038974 dated Dec. 22, 2020.
Extended European Search Report dated Dec. 15, 2022 in Application No. 20899624.9.

* cited by examiner

*Primary Examiner* — Steven D Maki
(74) *Attorney, Agent, or Firm* — Sughrue Mion, PLLC

(57) ABSTRACT

Provided is a rubber composition for base tread which can provide excellent steering stability and rolling resistance and improve pass-by noise properties when applied to a tire. The present disclosure discloses a rubber composition for base tread to be used for base tread of a tread portion of a tire, where a ratio of storage modulus at 0° C. (0° C. E') to storage modulus at 30° C. (30° C. E') (0° C. E'/30° C. E') is in a range of 1.3 to 2.0.

12 Claims, No Drawings

RUBBER COMPOSITION FOR BASE TREAD AND TIRE

CROSS REFERENCE TO RELATED APPLICATIONS

This application is a National Stage of International Application No. PCT/JP2020/038974 filed Oct. 15, 2020, claiming priority based on Japanese Patent Application No. 2019-225890 filed Dec. 13, 2019 and Japanese Patent Application No. 2019-225896 filed Dec. 13, 2019.

TECHNICAL FIELD

This disclosure relates to a rubber composition for base tread and a tire.

BACKGROUND

From the viewpoint of improving the fuel efficiency of vehicles (achieving low fuel consumption), there are known techniques for optimizing rubber components (base tread) forming a base portion of tread of a tire.

For example, JP 2016-006135 A (PTL 1) describes a technique in which rubber components and filler are adjusted to apply a rubber composition with improved low heat generating properties (with a low tan δ) to base tread.

However, when the tan δ (loss tangent) of a rubber composition is kept low as in the base tread described in PTL 1, the rolling resistance and the fuel efficiency can be improved, but the noise of tires when a vehicle passes (pass-by noise) is increased. Further, when the tan δ of a rubber composition is kept low, it is considered that the rigidity of rubber is lowered, and the steering stability when applied to a tire is deteriorated.

Therefore, it has been desired to develop a base tread that is excellent in steering stability and rolling resistance and has improved pass-by noise properties.

CITATION LIST

Patent Literature

PTL 1: JP 2016-006135 A

SUMMARY

Technical Problem

It could thus be helpful to provide a rubber composition for base tread which can provide excellent steering stability and rolling resistance and improve pass-by noise properties when applied to a tire. It is also helpful to provide a tire which is excellent in steering stability and rolling resistance and has improved pass-by noise properties.

As a result of studies aimed at achieving both a reduction in rolling resistance and an improvement in pass-by noise properties when applied to a tire, we focused on the relationship between tire vibration and rubber factors that affect pass-by noise. As a result of further diligent research, we found that, by setting the ratio of E' at 0° C. to E' at 30° C. in a certain range (specifically, setting 0° C. E'/30° C. E' to 1.3 to 2.0), it is possible to increase the tan δ at high frequencies that affects pass-by noise while maintaining the tire rigidity, thereby realizing excellent steering stability and rolling resistance and improving pass-by noise properties when the rubber composition is applied to a tire.

Solution to Problem

We thus provide the following.

A rubber composition for base tread to be used for base tread of a tread portion of a tire, where a ratio of storage modulus at 0° C. (0° C. E') to storage modulus at 30° C. (30° C. E') (0° C. E'/30° C. E') is in a range of 1.3 to 2.0.

By providing the above configuration, it is possible to improve the steering stability, the rolling resistance, and the pass-by noise properties when applied to a tire.

In the rubber composition for base tread of the present disclosure, the 0° C. E'/30° C. E' is preferably in a range of 1.4 to 1.6. This is because both the steering stability and rolling resistance and the improvement of pass-by noise properties when applied to a tire can be achieved at a higher level in this case.

In the rubber composition for base tread of the present disclosure, the 0° C. E' is preferably 15 MPa or less. This is because the pass-by noise properties when applied to a tire can be more reliably improved in this case.

In the rubber composition for base tread of the present disclosure, the 30° C. E' is preferably 10 MPa or less. This is because the steering stability and rolling resistance when applied to a tire can be more reliably improved in this case.

In the rubber composition for base tread of the present disclosure, the tan δ at 0° C. (0° C. tan δ) of the rubber composition for base tread is preferably 0.35 or more. This is because the pass-by noise properties when applied to a tire can be more reliably improved in this case.

The rubber composition for base tread of the present disclosure preferably contains a rubber component containing 70% by mass or more of natural rubber, a filler, and a resin of 20% by mass or more with respect to 100 parts by mass of the rubber component. This is because the steering stability, the rolling resistance, and the pass-by noise properties when applied to a tire can be more reliably improved in this case.

In the rubber composition for base tread of the present disclosure, the resin is preferably at least one of a $C_5$-based resin, a $C_5$ to $C_9$-based resin, a $C_9$-based resin, and a hydrogenated product thereof. This is because the pass-by noise properties when applied to a tire can be more reliably improved in this case.

In the rubber composition for base tread of the present disclosure, the sulfur content is preferably 4 parts by mass to 10 parts by mass with respect to 100 parts by mass of the rubber component. This is because both the rolling resistance and the pass-by noise properties when applied to a tire can be achieved at a higher level in this case.

In the rubber composition for base tread of the present disclosure, the resin content is preferably 20 parts by mass to 40 parts by mass with respect to 100 parts by mass of the rubber component. This is because both the rolling resistance and the pass-by noise properties when applied to a tire can be achieved at a higher level in this case.

The tire of the present disclosure uses the rubber composition for base tread of the present disclosure described above in base tread of a tread portion.

By providing the above configuration, it is possible to obtain excellent steering stability and rolling resistance and improve pass-by noise properties.

Advantageous Effect

According to the present disclosure, it is possible to provide a rubber composition for base tread which can provide excellent steering stability and rolling resistance and improve pass-by noise properties when applied to a tire. Further, according to the present disclosure, it is possible to provide a tire which is excellent in steering stability and rolling resistance and has improved pass-by noise properties.

DETAILED DESCRIPTION

The following describes the rubber composition for base tread and the tire of the present disclosure in detail based on embodiments.

<Rubber Composition for Base Tread>

The rubber composition for base tread of the present disclosure is a rubber composition for base tread used for base tread of a tread portion of a tire.

The rubber composition for base tread of the present disclosure has a ratio (0° C. E'/30° C. E') of storage modulus at 0° C. (0° C. E') to storage modulus at 30° C. (30° C. E') in a range of 1.3 to 2.0.

When examining the rolling resistance of a tire, there are problems that, when the tan δ is reduced, the rolling resistance of a tire can be improved, but the pass-by noise level deteriorates, and when the tan δ is increased, the pass-by noise level can be suppressed, but the rolling resistance deteriorates.

On the other hand, when the storage modulus E' is increased, the rolling resistance and the steering stability are improved, but the pass-by noise properties tend to deteriorate due to the increased rigidity. Therefore, the present disclosure studies a technique for increasing only the tan δ at high frequencies without excessively increasing the rigidity and focuses on the non-linearity of the temperature dispersion of the storage modulus E'.

As a result, in the rubber composition for base tread of the present disclosure, a ratio (0° C. E'/30° C. E') of storage modulus at 0° C. (0° C. E') with respect to storage modulus at 30° C. (30° C. E') is set to 1.3 to 2.0, so that the tan δ at low frequencies can be lowered, the decrease in the storage modulus E' can be suppressed, and the tan δ at high frequencies can be increased. Therefore, when the rubber composition for base tread is applied to a tire, it is possible to obtain excellent steering stability and rolling resistance and improve pass-by noise properties.

As described above, in the rubber composition for base tread of the present disclosure, the 0° C. E'/30° C. E' needs to be 1.3 to 2.0 or more. When the 0° C. E'/30° C. E' is less than 1.3, the tan δ at low temperatures cannot be increased (the tan δ at high frequencies cannot be increased). As a result, the pass-by noise cannot be sufficiently reduced when it is applied to a tire. On the other hand, when the 0° C. E'/30° C. E' exceeds 2.0, the E' at high temperatures is reduced. As a result, sufficient steering stability and reinforcing properties cannot be secured when it is applied to a tire.

From the same viewpoint, the 0° C. E'/30° C. E' is preferably 1.3 to 1.8 and more preferably 1.4 to 1.6.

The 0° C. E' and the 30° C. E' in the present disclosure refer to the storage modulus at 0° C. and the storage modulus at 30° C. after vulcanization of the rubber composition for base tread of the present disclosure.

The 0° C. E' and the 30° C. E' can be measured, for example, using a spectrometer manufactured by Ueshima Seisakusho Co., Ltd. However, the method is not particularly limited if the respective E' values can be accurately obtained, and they can be obtained using a known measuring instrument.

Further, examples of the conditions of initial input, dynamic strain, and frequency during the measurement of the 0° C. tan δ and the 30° C. tan δ include a set of conditions of initial input of 150 μm, frequency of 52 Hz, and dynamic strain of 1%.

The value of the storage modulus at 0° C. (0° C. E') of the rubber composition for base tread of the present disclosure is not particularly limited if the above-described relationship of 0° C. E'/30° C. E' can be satisfied. However, from the viewpoint of further enhancing the effect of improving pass-by noise properties when applied to a tire, it is preferably 15 MPa or less and more preferably 10 MPa or less. From the viewpoint of not deteriorating steering stability or rolling resistance when applied to a tire, the 0° C. E' is preferably 5 MPa or more.

The value of the storage modulus at 30° C. (30° C. E') of the rubber composition for base tread of the present disclosure is not particularly limited if the above-described relationship of 0° C. E'/30° C. E' can be satisfied. However, from the viewpoint of further enhancing the effect of improving pass-by noise properties when applied to a tire, it is preferably 10 MPa or less and more preferably 5 MPa or less. From the viewpoint of not deteriorating steering stability or rolling resistance when applied to a tire, the 30° C. E' is preferably 3 MPa or more.

A method of adjusting the value of 0° C. E'/30° C. E' within the predetermined range is not particularly limited. For example, it can be adjusted by optimizing the constituent components of the rubber composition for base tread of the present disclosure. As will be described later, the value of the 0° C. E'/30° C. E' can be set within the range of the present disclosure (1.3 to 2.0) by limiting the type and content of the rubber component or adjusting the type and content of the filler.

In the rubber composition for base tread of the present disclosure, the tan δ at 0° C. (0° C. tan δ) is preferably 0.35 or more from the viewpoint of further enhancing the effect of suppressing pass-by noise when applied to a tire. From the same viewpoint, the 0° C. tan δ is more preferably 0.4 or more.

In the rubber composition for base tread of the present disclosure, the tan δ at 30° C. (30° C. tan δ) is preferably 0.2 or less from the viewpoint of further improving the steering stability and the rolling resistance when applied to a tire. From the same viewpoint, the 30° C. tan δ is more preferably 0.15 or less.

The 0° C. tan δ and the 30° C. tan δ are 0° C. tan δ and 30° C. tan δ after vulcanization of the rubber composition for base tread of the present disclosure.

The 0° C. tan δ and the 30° C. tan δ can be measured, for example, using a spectrometer manufactured by Ueshima Seisakusho Co., Ltd. However, the method is not particularly limited if the respective tan δ values can be accurately obtained, and they can be obtained using a commonly used measuring instrument.

Further, examples of the conditions of initial input, dynamic strain, and frequency during the measurement of the 0° C. tan δ and the 30° C. tan δ include a set of conditions of initial input of 150 μm, frequency of 52 Hz, and dynamic strain of 1%.

Components of the rubber composition for base tread of the present disclosure are not particularly limited if they can satisfy the above-described relationship of 0° C. E'/30° C. E'.

The type and content of rubber component and filler can be adjusted as appropriate depending on the performance required for the base tread.

The rubber composition for base tread of the present disclosure may contain a rubber component containing natural rubber, a filler, and a resin from the viewpoints of easily satisfying the above-described relationship of 0° C. E'/30° C. E', and, when applied to a tire, more reliably achieving both the steering stability and rolling resistance and the improvement of pass-by noise properties.

The rubber component of the rubber composition for base tread of the present disclosure preferably contains at least natural rubber (NR). This is because, in this case, the above-described relationship of 0° C. E'/30° C. E' can be easily satisfied, and excellent improvement in pass-by noise properties can be obtained while maintaining good rolling resistance and steering stability.

The content of the natural rubber in the rubber component is not particularly limited. However, it is preferably 70 mass % or more, preferably 75 mass % or more, more preferably 80 mass % or more, and particularly preferably 85 mass % or more from the viewpoint of, when applied to a tire, achieving both the steering stability and rolling resistance and the improvement of pass-by noise properties at a higher level.

The rubber component may further contain styrene butadiene rubber (SBR) and/or butadiene rubber (BR) in addition to the natural rubber, which is preferable because the tan δ at high frequencies can be increased and the effect of improving the pass-by noise properties can be further improved when applied to a tire.

Although the total content of the styrene butadiene rubber and/or the butadiene rubber in the rubber component is not particularly limited, it is preferably less than that of the natural rubber. Specifically, it is more preferably 5 mass % to 30 mass % and still more preferably 10 mass % to 20 mass %.

The rubber component may be unmodified or modified.

Further, the rubber component may include rubber (other rubber components) other than the above-described NR, SBR and BR depending on the required performance. Examples of the other rubber components include diene-based rubber such as isoprene rubber (IR), styrene isoprene butadiene rubber (SIBR), chloroprene rubber (CR) and acrylonitrile butadiene rubber (NBR), and non-diene-based rubber such as ethylene propylene diene rubber (EPDM), ethylene propylene rubber (EPM) and butyl rubber (IIR).

The type, content, and the like of an inorganic filler contained in the rubber composition for base tread of the present disclosure are not particularly limited and can be appropriately modified depending on the required performance.

For example, carbon black, silica, other inorganic fillers, and the like may be contained as the inorganic filler. Among these fillers, it is preferable that the filler contain carbon black from the viewpoint of obtaining better reinforcing properties and wear resistance.

The nitrogen adsorption specific surface area ($N_2SA$) of the carbon black is preferably 20 $m^2/g$ to 80 $m^2/g$ and more preferably 40 $m^2/g$ to 60 $m^2/g$. This can further optimize the structure of the carbon black, so that the reinforcing properties can be further improved while reducing the rolling resistance.

The nitrogen adsorption specific surface area can be measured with a single-point method in accordance with ISO4652-1. For example, after immersing degassed carbon black in liquid nitrogen, the amount of nitrogen adsorbed on the carbon black surface at equilibrium is measured, and the specific surface area ($m^2/g$) can be calculated from the measured value.

The content of the carbon black contained in the rubber composition for base tread of the present disclosure is preferably 25 parts by mass to 65 parts by mass and more preferably 30 parts by mass to 45 parts by mass with respect to 100 parts by mass of the rubber component. By setting the content of the carbon black to 25 parts by mass or more with respect to 100 parts by mass of the rubber component, higher reinforcing properties and crack growth resistance can be obtained, and by setting it to 65 parts by mass or less with respect to 100 parts by mass of the rubber component, deterioration of rolling resistance can be suppressed when applied to a tire.

Further, silica and other inorganic fillers can be contained as the inorganic filler.

Examples of the type of the silica include wet silica, colloidal silica, calcium silicate, and aluminum silicate.

The rubber composition of the present disclosure may also contain a resin from the viewpoint of further improving the effect of improving pass-by noise properties.

Examples of the resin include a petroleum-based hydrocarbon resin, a dicyclopentadiene resin, a rosin resin, an alkylphenol resin, and a resin that is a hydrogenated product thereof. These resins may be used alone or in combination of two or more. Among these resins, it is preferable to use at least one of a $C_5$-based resin, a $C_5$ to $C_9$-based resin, a $C_9$-based resin, and a hydrogenated product thereof.

The $C_5$-based resin refers to a $C_5$-based synthetic petroleum-based hydrocarbon resin, and examples of the $C_5$-based resin include an aliphatic petroleum resin obtained by polymerizing a $C_5$ fraction, which is obtained by thermal decomposition of naphtha in the petrochemical industry, using a Friedel-Crafts catalyst such as $AlCl_3$ and $BF_3$. The $C_5$ fraction usually contains olefin-based hydrocarbon such as 1-pentene, 2-pentene, 2-methyl butene, 2-methyl-2-butene and 3-methyl-1-butene, and diolefin-based hydrocarbon such as 2-methyl-1,3-butadiene, 1,2-pentadiene, 1,3-pentadiene and 3-methyl-1,2-butadiene. The $C_5$-based resin may be a commercially available product, and examples thereof include "Escorez® 1000 series" (Escorez is a registered trademark in Japan, other countries, or both) that is an aliphatic petroleum resin manufactured by ExxonMobil Chemical, "A100, B170, M100, R100" in "Quintone® 100 series" (Quintone is a registered trademark in Japan, other countries, or both) that is an aliphatic petroleum resin manufactured by Zeon Corporation, and "T-REZ RA100" manufactured by Tonen Chemical Corporation.

The $C_5$ to $C_9$-based resin refers to a $C_5$ to $C_9$-based synthetic petroleum-based hydrocarbon resin, and examples of the $C_5$ to $C_9$-based resin include a solid polymer obtained by polymerizing petroleum-derived $C_5$ and $C_9$ fractions using a Friedel-Crafts catalyst such as $AlCl_3$ and $BF_3$. More specifically, examples thereof include copolymers containing styrene, vinyltoluene, α-methylstyrene, indene and the like as main components. The $C_5$ to $C_9$-based resin is preferably a resin having a small amount of $C_9$ or higher components from the viewpoint of compatibility with the rubber component. As used herein, "having a small amount of $C_9$ or higher components" means that the amount of $C_9$ or higher components in the total amount of the resin is less than 50% by mass and is preferably 40% by mass or less. The $C_5$ to $C_9$-based resin may be a commercially available product, and examples thereof include product name "Quintone® G100B" (manufactured by Zeon Corporation), product name "ECR213" (manufactured by ExxonMobil Chemical), and product name "T-REZ RD104" (manufactured by Tonen Chemical Corporation).

The $C_9$-based resin is a synthetic petroleum-based hydrocarbon resin, and examples thereof include a resin obtained by polymerizing a 9-carbon aromatic compound with vinyltoluene, alkylstyrene, and indene as main monomers, which are $C_9$ fractions produced as by-products with basic petrochemical raw materials such as ethylene and propylene due to thermal decomposition of naphtha in the petrochemical industry. Here, specific examples of the $C_9$ fraction obtained by thermal decomposition of naphtha include vinyltoluene, α-methylstyrene, β-methylstyrene, γ-methylstyrene, o-methylstyrene, p-methylstyrene, and indene. The $C_9$-based resin may be obtained by using styrene or the like, which is a $C_8$ fraction, methylindene or 1,3-dimethylstyrene or the like, which is a $C_{10}$ fraction, and naphthalene, vinyl naphthalene, vinyl anthracene, p-tert-butyl styrene or the like as raw materials together with the $C_9$ fraction and copolymerizing these $C_8$ to $C_{10}$ fractions and the like as a mixture with, for example, a Friedel-Crafts catalyst. The $C_9$-based resin may be a modified petroleum resin that has been modified with a compound having a hydroxyl group, an unsaturated carboxylic acid compound, or the like. The $C_9$-based resin may be a commercially available product, and examples thereof include, as an unmodified $C_9$-based petroleum resin, product names "Nisseki Neopolymer® L-90" (Nisseki Neopolymer is a registered trademark in Japan, other countries, or both), "Nisseki Neopolymer® 120", "Nisseki Neopolymer® 130", and "Nisseki Neopolymer® 140" (manufactured by JX Nippon Oil & Energy Corporation).

The dicyclopentadiene resin is a petroleum resin produced by using dicyclopentadiene as a main raw material, which is obtained by dimerizing cyclopentadiene. The dicyclopentadiene resin may be a commercially available product, and examples thereof include "1105, 1325, 1340" in product name "Quintone® 1000 series" that are alicyclic petroleum resins manufactured by Zeon Corporation.

The terpene phenol resin can be obtained, for example, with a method of reacting terpenes with various phenols using a Friedel-Crafts catalyst, or further performing condensation with formalin. The terpenes as a raw material are not particularly limited, and they are preferably monoterpene hydrocarbon such as α-pinene and limonene, more preferably those containing α-pinene, and particularly preferably α-pinene. The terpene phenol resin may be a commercially available product, and examples thereof include product names "TAMANOL 803L" and "TAMANOL 901" (manufactured by ARAKAWA CHEMICAL INDUSTRIES, LTD.), and product names "YS POLYSTER® U" (YS POLYSTER is a registered trademark in Japan, other countries, or both) series, "YS POLYSTER® T" series, "YS POLYSTER® S" series, "YS POLYSTER® G" series, "YS POLYSTER® N" series, "YS POLYSTER® K" series, and "YS POLYSTER® TH" series (manufactured by YASUHARA CHEMICAL CO., LTD.).

The terpene resin is a solid resin obtained by blending turpentine oil, which is obtained at the same time as obtaining rosin from a pine tree, or a polymerization component separated from the turpentine oil, and performing polymerization using a Friedel-Crafts catalyst. Examples thereof include β-pinene resin and α-pinene resin. The terpene resin may be a commercially available product, and examples thereof include product name "YS RESIN" series (PX-1250, TR-105, and the like) manufactured by YASUHARA CHEMICAL CO., LTD., and product name "Piccolyte" series (A115, 5115, and the like) manufactured by HERCULES Co. LTD.

The rosin resin is a residue left after collecting balsams such as pine resin (rosin), which is the sap of a plant of the pine family, and distilling turpentine essential oil, and it is a natural resin containing rosin acid (abietic acid, palustric acid, isopimaric acid, and the like) as a main component, or a modified resin or a hydrogenated resin obtained by modifying or hydrogenating the natural resin. Examples thereof include natural resin rosin, polymerized rosin or partially hydrogenated rosin thereof; glycerin ester rosin, partially hydrogenated rosin or fully hydrogenated rosin or polymerized rosin thereof; and pentaerythritol ester rosin, partially hydrogenated rosin and polymerized rosin thereof. Examples of the natural resin rosin include gum rosin contained in raw rosin and tall oil, tall oil rosin, and wood rosin. The rosin resin may be a commercially available product, and examples thereof include product name "NEO-TALL 105" (manufactured by Harima Chemicals Group, Inc.), product name "SN TACK 754" (manufactured by San Nopco Ltd.), product names "LIME RESIN No. 1", "PENSEL A" and "PENSEL AD" (manufactured by ARAKAWA CHEMICAL INDUSTRIES, LTD.), product names "Poly-Pale" and "Pentalyn C" (manufactured by Eastman Chemical Company), and product name "Highrosin® S" (Highrosin is a registered trademark in Japan, other countries, or both) (manufactured by Taishamatsu essential oil Co., Ltd.)

The alkylphenol resin is obtained, for example, by a condensation reaction of alkylphenol and formaldehyde with a catalyst. The alkylphenol resin may be a commercially available product, and examples thereof include product name "Hitanol 1502P" (alkylphenol formaldehyde resin, manufactured by Hitachi Chemical Co., Ltd.), product name "TACKIROL 201" (alkylphenol formaldehyde resin, manufactured by Taoka Chemical Co., Ltd.), product name "TACKIROL 250-I" (brominated alkylphenol formaldehyde resin, manufactured by Taoka Chemical Co., Ltd.), product name "TACKIROL 250-III" (brominated alkylphenol formaldehyde resin, manufactured by Taoka Chemical Co., Ltd.), and product names "R7521P", "SP1068", "R7510PJ", "R7572P" and "R7578P" (manufactured by SI GROUP INC.)

The hydrogenated product of a resin such as the $C_5$-based resin and the $C_9$-based resin is a resin in which an unsaturated bond in the molecule is partially or fully hydrogenated (hereinafter, also referred to as "hydrogenated resin").

To increase the tan δ in high frequency ranges and enhance the effect of reducing pass-by noise when applied to a tire, the content of the resin in the rubber composition of the present disclosure is preferably 20 parts by mass or more and more preferably 40 parts by mass or less with respect to 100 parts by mass of the rubber component. This is because, in this case, deterioration of reinforcing properties and deterioration of low heat generating properties can be suppressed, and good crack resistance and rolling resistance can be maintained when applied to a tire.

The rubber composition for base tread of the present disclosure may contain other components in addition to the above-described rubber component and filler if the effects of the present disclosure are not impaired.

For example, additives that are commonly used in the rubber industry, such as a silane coupling agent, a softener, a stearic acid, an age resistor, a vulcanizing agent (sulfur), a vulcanization accelerator and a vulcanization accelerating aid, may be appropriately contained as the other components.

The rubber composition for base tread of the present disclosure preferably contains sulfur as another component.

This is because, in this case, the reinforcing properties of the rubber after vulcanization can be enhanced, so that the steering stability and the wear resistance when applied to a tire can be further improved.

The content of the sulfur is preferably 4 parts by mass or more and more preferably 5 parts by mass or more with respect to 100 parts by mass of the rubber component. This is because the reinforcing properties of the rubber after vulcanization can be further enhanced in this case. Further, the content of the sulfur is preferably 10 parts by mass or less and more preferably 8.5 parts by mass or less with respect to 100 parts by mass of the rubber component. This is because, in this case, the reduction of the rubber in flexibility can be prevented, and good crack growth resistance can be maintained when applied to a tire.

When the rubber composition for base tread of the present disclosure contains silica as the filler, it is preferable to further contain a silane coupling agent. This is because the effects in reinforcing properties and low heat generating properties by the silica can be further improved in this case. Known silane coupling agents may be appropriately used as the silane coupling agent.

The age resistor may use a known one, which is not particularly limited. Examples thereof include a phenol-based age resistor, an imidazole-based age resistor, and an amine-based age resistor. These age resistors may be used alone or in combination of two or more.

The vulcanization accelerator may use a known one, which is not particularly limited. Examples thereof include thiazole-based vulcanization accelerators such as 2-mercaptobenzothiazole, and dibenzothiazyl disulfide; sulfenamide-based vulcanization accelerators such as N-cyclohexyl-2-benzothiazyl sulfenamide, and N-t-butyl-2-benzothiazyl sulfenamide; guanidine-based vulcanization accelerators such as diphenylguanidine (1,3-diphenylguanidine and the like); thiuram-based vulcanization accelerators such as tetramethyl thiuram disulfide, tetraethyl thiuram disulfide, tetrabutyl thiuram disulfide, tetradodecyl thiuram disulfide, tetraoctyl thiuram disulfide, tetrabenzyl thiuram disulfide, and dipentamethylene thiuram tetrasulfide; dithiocarbamate-based vulcanization accelerators such as zinc dimethyldithiocarbamate; and zinc dialkyldithiophosphate.

Examples of the vulcanization accelerating aid include zinc oxide (ZnO) and fatty acid. The fatty acid may be saturated or unsaturated, linear or branched fatty acid. The carbon number of the fatty acid is not particularly limited. Examples thereof include fatty acids with 1 to 30 carbon atoms, preferably 15 to 30 carbon atoms, more specifically, naphthenic acids such as cyclohexanoic acid (cyclohexanecarboxylic acid), and alkylcyclopentane with a side chain; saturated fatty acids such as hexanoic acid, octanoic acid, decanoic acid (including branched carboxylic acid such as neodecanoic acid), dodecanoic acid, tetradecanoic acid, hexadecanoic acid, and octadecanoic acid (stearic acid); and unsaturated fatty acids such as methacrylic acid, oleic acid, linoleic acid, and linolenic acid; and resin acids such as rosin, tall oil acid, and abietic acid. These may be used alone or in combination of two or more. In the present disclosure, zinc oxide and stearic acid can be suitably used.
<Tire>

The tire of the present disclosure uses the rubber composition for base tread of the present disclosure described above in base tread of a tread portion.

By using the rubber composition for base tread of the present disclosure as the base tread, it is possible to improve the steering stability and rolling resistance and improve the pass-by noise properties.

In the tread portion of the tire of the present disclosure, the configuration of a cap tread formed on the base tread is not particularly limited. A suitable cap tread may be used depending on the performance required for the tire.

A rubber composition forming the cap tread may contain, for example, a rubber component, a reinforcing filler, a softener, and additives commonly used in the rubber industry.

Depending on the type of tire to be applied, the tire of the present disclosure may be vulcanized after molding using an unvulcanized rubber composition or may be manufactured by molding using semi-vulcanized rubber that has undergone a preliminary vulcanization process or the like, and then further performing main vulcanization.

Further, the tire of the present disclosure is preferably a pneumatic tire, and the gas to be filled in the pneumatic tire may be, in addition to normal air or air whose oxygen partial pressure has been adjusted, an inert gas such as nitrogen, argon, and helium.

The tire of the present disclosure can be used as a tire for various vehicles, but it is preferably used as a tire for passenger vehicles or a tire for trucks and buses. This is because, in this case, the benefits of achieving both a reduction in rolling resistance and an improvement in pass-by noise properties can be further enjoyed.

EXAMPLES

The following describes the present disclosure in more detail with reference to examples, but the present disclosure is not limited to the following examples.

Examples 1 to 3 and Comparative Examples 1 to 2

According to the composition listed in Table 1, a rubber composition for base tread as a sample was prepared using a normal Banbury mixer. The blending amount of each component in Table 1 is the amount (parts by mass) with respect to 100 parts by mass of the rubber component.

Further, the obtained rubber composition for base tread was subjected to vulcanization treatment at 145° C. for 33 minutes, and the loss tangent (tan δ) and the storage modulus (E') at 0° C. and 30° C. of the obtained vulcanized rubber were measured at initial input of 150 μm, frequency of 52 Hz, and dynamic strain of 1% using a spectrometer manufactured by Ueshima Seisakusho Co., Ltd. The measured tan δ and E' at 0° C. and 30° C. are listed in Table 1.
<Evaluation>

Regarding the obtained samples of rubber composition for base tread, the sample of Comparative Example 1 was used in base tread of a tread portion to prepare a sample of a pneumatic radial tire for passenger vehicles of size of 205/60R16. The prepared sample of tire was evaluated with the following methods. The results are listed in Table 1.
(1) Rolling Resistance The rolling resistance coefficient (RRC) of the tire of Comparative Example 1 was measured in accordance with the international standard (ECE R117). Examples 1 to 3 and Comparative Example 2 were estimated based on the measured rubber physical properties and the measurement result of the tire of Comparative Example 1.

The evaluation result was indicated as an index, which is the reciprocal of the estimated RRC with the reciprocal of the RRC of the tire using the sample of Comparative Example 1 being 100. The larger the value of the index is, the better the rolling resistance is (the more the rolling resistance is reduced). The result is judged to be good when it is 90 or more. The evaluation results are listed in Table 1.

(2) Pass-by Noise Level

The pass-by noise (dB) of the tire of Comparative Example 1 was measured in accordance with the international standard (ECE R117). Examples 1 to 3 and Comparative Example 2 were estimated based on the measured rubber physical properties and the measurement result of the tire of Comparative Example 1.

The evaluation result was obtained by calculating the difference in noise level from the pass-by noise (dB) of Comparative Example 1 and indicated as a pass-by noise level. The smaller the pass-by noise level is, the more the pass-by noise is reduced. The result is judged to be good when it is 110 or less. The evaluation results are listed in Table 1.

(3) Steering Stability

The tire of Comparative Example 1 was installed to a test vehicle, and the steering stability was evaluated by the driver's feeling score in an actual vehicle test on a dry road surface. Examples 1 to 3 and Comparative Example 2 were estimated based on the measured rubber physical properties and the measurement result of the tire of Comparative Example 1.

Regarding the evaluation, the feeling scores of other tires were indicated with the score of the rubber composition of Comparative Example 1 being 100. The larger the score value is, the better the steering stability is.

INDUSTRIAL APPLICABILITY

According to the present disclosure, it is possible to provide a rubber composition for base tread which can provide excellent steering stability and rolling resistance and improve pass-by noise properties when applied to a tire. Further, according to the present disclosure, it is possible to provide a tire which is excellent in steering stability and rolling resistance and has improved pass-by noise properties.

The invention claimed is:

1. A rubber composition for base tread, which is a rubber composition for base tread to be used for base tread of a tread portion of a tire,
   wherein the rubber composition for base tread contains a rubber component containing 70% by mass or more of natural rubber, a filler, sulfur, and a resin being at least one of a $C_5$-based resin, a $C_5$ to $C_9$-based resin, a $C_9$-based resin, and a hydrogenated product thereof,
   wherein a ratio of storage modulus at 0° C., expressed as 0° C. E', to storage modulus at 30° C., expressed as 30° C. E', that is, 0° C. E'/30° C. E' is in a range of 1.3 to 2.0,
   wherein the tan ° C. at 30° C. (30° C. tan δ) is 0.2 or less,
   wherein a content of the resin is 20 parts by mass to 40 parts by mass with respect to 100 parts by mass of the rubber component,
   wherein a content of the sulfur is 4 parts by mass to 10 parts by mass with respect to 100 parts by mass of the rubber component,

| Rubber composition for base rubber | | Comparative Example 1 | Example 1 | Example 2 | Example 3 | Comparative Example 2 |
|---|---|---|---|---|---|---|
| Composition | Natural rubber *1 | 85 | 85 | 85 | 70 | 85 |
| | Butadiene rubber *2 | 15 | 15 | 15 | 15 | 15 |
| | Styrene butadiene rubber *3 | — | — | — | 15 | — |
| | Oil *4 | 2.19 | 2.19 | — | — | 2.19 |
| | Resin *5 | — | — | 20 | — | — |
| | Resin *6 | — | 20 | — | 20 | — |
| | Resin *7 | — | — | — | — | 20 |
| | Sulfur | 4.06 | 4.06 | 6.09 | 8.12 | 4.06 |
| | Carton black *8 | 40 | 40 | 40 | 40 | 40 |
| Physical properties | 0° C. E' (MPa) | 6.6 | 5.5 | 7.2 | 7.5 | 29.5 |
| | 30° C. E' (MPa) | 5.5 | 3.9 | 5.0 | 4.8 | 23.4 |
| | 0° C. E'/30° C. E' | 1.20 | 1.42 | 1.44 | 1.56 | 1.26 |
| | 0° C. tanδ | 0.20 | 0.38 | 0.38 | 0.44 | 0.19 |
| | 30° C. tanδ | 0.10 | 0.13 | 0.12 | 0.13 | 0.14 |
| Evaluation | Rolling resistance (the larger, the better) | 100 | 92 | 95 | 93 | 89 |
| | Pass-by noise level (the larger, the better) | 100 | 105 | 106 | 110 | 98 |
| | Steering stability (the larger, the better) | 100 | 100 | 102 | 101 | 82 |

*1 RSS #3
*2 "BR01" manufactured by JSR Corporation
*3 "SL520" manufactured by JSR Corporation, styrene content: 35% by mass
*4 "Super Oil Y22" manufactured by JXTG corporation,
*5 Aliphatic hydrocarbon resin, "Quintone G100" manufactured by Zeon Corporation
*6 Petroleum-based hydrocarbon resin
*7 Modified phenol resin, "PR-13349" manufactured by Sumitomo Bakelite Co., Ltd.
*8 "Seast F" manufactured by TOKAI CARBON CO., LTD.

From the results in Table 1, it is understood that the samples of Examples 1 to 3 had excellent effects in terms of rolling resistance, pass-by noise level, and steering stability in a well-balanced manner, as compared with each sample of Comparative Examples.

In addition, each sample of Comparative Examples was inferior to Examples in at least one evaluation item.

wherein the filler contains carbon black and a content of the carbon black is 25 parts by mass to 65 parts by mass with respect to 100 parts by mass of the rubber component, and
   wherein the rubber component further contains styrene butadiene rubber and/or butadiene rubber in addition to the natural rubber and a total content of the styrene butadiene rubber and/or the butadiene rubber in the rubber component is 5 mass % to 30 mass %.

2. The rubber composition for base tread according to claim 1, wherein the 0° C. E'/30° C. E' is in a range of 1.4 to 1.6.

3. The rubber composition for base tread according to claim 2, wherein the 0° C. E' is 15 MPa or less.

4. The rubber composition for base tread according to claim 2, wherein the 30° C. E' is 10 MPa or less.

5. The rubber composition for base tread according to claim 2, wherein tan δ at 0° C., expressed as 0° C. tan δ, of the rubber composition for base tread is 0.35 or more.

6. The rubber composition for base tread according to claim 1, wherein the 0° C. E' is 15 MPa or less.

7. The rubber composition for base tread according to claim 6, wherein the 30° C. E' is 10 MPa or less.

8. The rubber composition for base tread according to claim 6, wherein tan δ at 0° C., expressed as 0° C. tan δ, of the rubber composition for base tread is 0.35 or more.

9. The rubber composition for base tread according to claim 1, wherein the 30° C. E' is 10 MPa or less.

10. The rubber composition for base tread according to claim 9, wherein tan δ at 0° C., expressed as 0° C. tan δ, of the rubber composition for base tread is 0.35 or more.

11. The rubber composition for base tread according to claim 1, wherein tan δ at 0° C., expressed as 0° C. tan δ, of the rubber composition for base tread is 0.35 or more.

12. A tire, using the rubber composition for base tread according to claim 1 in base tread of a tread portion.

* * * * *